United States Patent
Zhang et al.

(10) Patent No.: US 10,870,261 B2
(45) Date of Patent: Dec. 22, 2020

(54) STRUCTURED GLASS FOR AN ELECTRONIC DEVICE

(71) Applicant: Apple Inc., Cupertino, CA (US)

(72) Inventors: Li Zhang, Mountain View, CA (US); John Raff, Menlo Park, CA (US); Florence W. Ow, Los Altos Hills, CA (US); Guangtao Zhang, San Francisco, CA (US); Soyoung Kim, Redwood City, CA (US); Victor Luzzato, Santa Clara, CA (US); Daniel B. Sargent, Cupertino, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 15/803,481

(22) Filed: Nov. 3, 2017

(65) Prior Publication Data

US 2018/0126704 A1     May 10, 2018

Related U.S. Application Data

(60) Provisional application No. 62/417,989, filed on Nov. 4, 2016.

(51) Int. Cl.
| | |
|---|---|
| *B32B 17/06* | (2006.01) |
| *G06F 1/16* | (2006.01) |
| *H05K 5/02* | (2006.01) |
| *G06F 3/041* | (2006.01) |
| *C03B 9/03* | (2006.01) |
| *C03B 23/203* | (2006.01) |

(52) U.S. Cl.
CPC ............. *B32B 17/06* (2013.01); *C03B 9/03* (2013.01); *C03B 23/203* (2013.01); *G06F 1/16* (2013.01); *G06F 1/1633* (2013.01); *G06F 3/041* (2013.01); *H05K 5/02* (2013.01)

(58) Field of Classification Search
CPC ......... B32B 17/06; C03C 15/00; C03C 17/00; C03B 23/203; C03B 9/03; G06F 1/1633; G06F 3/041; G06F 1/16; H05K 5/02
USPC ..................................................... 361/679.55
See application file for complete search history.

(56) References Cited

U.S. PATENT DOCUMENTS

| | | | | |
|---|---|---|---|---|
| 9,392,706 | B2 * | 7/2016 | Yoo ....................... | G01J 1/0407 |
| 2013/0335837 | A1 * | 12/2013 | Wagner ................ | G02B 27/027 |
| | | | | 359/802 |
| 2014/0184933 | A1 * | 7/2014 | Park ........................ | G06F 3/044 |
| | | | | 349/12 |
| 2014/0285956 | A1 * | 9/2014 | Russell-Clarke ....... | B24B 7/242 |
| | | | | 361/679.01 |
| 2015/0077830 | A1 * | 3/2015 | Lin ........................ | G02F 1/157 |
| | | | | 359/275 |
| 2016/0224142 | A1 * | 8/2016 | Yang ....................... | G06F 3/041 |
| 2016/0311198 | A1 * | 10/2016 | Boratav ................ | G02B 6/0065 |
| 2016/0357294 | A1 * | 12/2016 | Ozeki .................... | B32B 17/06 |
| 2017/0364172 | A1 * | 12/2017 | Kim ....................... | G06F 1/1637 |

\* cited by examiner

*Primary Examiner* — Rockshana D Chowdhury
(74) *Attorney, Agent, or Firm* — Brownstein Hyatt Farber Schreck, LLP

(57) ABSTRACT

An electronic device can include a three-dimensional glass feature. In one embodiment, the three-dimensional glass feature is a cavity formed on the inside portion of a cover glass of an electronic device.

19 Claims, 12 Drawing Sheets

STRUCTURED GLASS FOR AN ELECTRONIC DEVICE

CROSS-REFERENCE TO RELATED APPLICATION(S)

This application is a nonprovisional patent application of and claims the benefit of U.S. Provisional Patent Application No. 62/417,989, filed Nov. 4, 2016 and titled "Structured Glass for an Electronic Device," the disclosure of which is hereby incorporated herein by reference in its entirety.

FIELD

The described embodiments relate generally to electronic devices. More particularly, the present embodiments relate to structured glass in electronic devices. Still more particularly, the present invention relates to three-dimensional structured glass as a component or feature included in an electronic device.

BACKGROUND

Many electronic devices, such as smart telephones, laptop computers, and tablet computing devices include a glass element or a glass portion. The glass may be used in a variety of ways, to include screens and coverings. Conventional glass applications in electronic devices have a flat interior cross-section and have been functionally limited by traditional manufacturing techniques and by conventional glass geometries.

The cover glass used in many electronic devices is illustrative of limitations imposed by typical glass geometries. Most cover glasses are planar sheets of glass and provide no internally-facing functionalities. That is, while the externally-facing cover glass commonly provides a touch-screen interface, the internal surface presents a restrictive planar design constraint for internal device electronics. However, a cover glass that provides a structured glass feature on the internally-facing portion reduces design constraints and may provide unique functionalities. For example, a three-dimensional lens may be formed on the internally-facing cover glass disposed over a camera, thereby providing an enhanced feature for the electronic device.

SUMMARY

In one aspect, a glass device configured for use with an electronic device is disclosed, the glass device comprising: a first surface; a second surface disposed opposite the first surface, the first and the second surfaces defining a first thickness; and a structured glass feature forming a cavity within the first thickness, the cavity having a perimeter on the second surface and an interior cavity surface; wherein the second surface faces an interior of the electronic device; wherein at least a portion of the interior cavity surface is optically masked.

In another aspect, the optically masked portion comprises the perimeter. In another aspect, the electronic device as in claim 14, wherein the glass device comprises a set of fused glass layers comprising a first layer with a first index of refraction and a second layer with a second index of refraction. In another aspect, at least a portion of the optically-masked portion is engaged with an optical coating. In another aspect, the glass device is a cover glass of the electronic device. In another aspect, the electronic device comprises a portable telephone. In another aspect, the cover glass comprises sapphire.

In one aspect, a method of manufacturing a glass device for use with an electronic device is disclosed, the method comprising: obtaining a glass layer with a first thickness; fixturing the glass layer; removing a portion of the glass layer to form a structured glass feature within the first thickness, the structured glass feature having a perimeter and a surface extending from the perimeter; and optically masking the perimeter wherein the perimeter is not visible to a naked eye.

In another aspect, the fixturing operation provides a guide to forming the structured glass feature during the operation of removing the portion of the glass layer. In another aspect, the method further comprises polishing the surface after the operation of removing the portion of the glass layer. In another aspect, the method further comprises pre-stressing the glass layer before the operation of removing the portion of the glass layer. In another aspect, the operation of removing the portion of the glass layer includes at least one of machining, etching, or lasering. In another aspect, the operation of optically masking the perimeter comprises application of an optical coating to the perimeter. In another aspect, the structured glass feature is an optical lens. In another aspect, the optical lens is configured for use with a camera of the electronic device. In another aspect, the method further comprises: pre-stressing the glass layer before the operation of removing the portion of the glass layer; and polishing the surface after the operation of removing the portion of the glass layer; wherein: the glass device is a sapphire cover glass of the electronic device; and the structured glass feature is an optical lens.

In one aspect, a method of manufacturing a cover glass for use with an electronic device is disclosed, the method comprising: obtaining a first glass layer with a first thickness; obtaining a second glass layer with a second thickness and an aperture formed within an interior of the second glass layer, the aperture defining a perimeter; coupling the first glass layer with the second glass layer; and fusing the first and the second glass layers to form a single monolithic structure; wherein the single monolithic structure includes a structured glass feature comprising the perimeter.

In another aspect, the method further comprises optically masking at least a portion of a surface extending from the perimeter. In another aspect, the method further comprises polishing a surface extending from the perimeter. In another aspect, the operation of fusing the first and the second glass layers includes at least one of heat fusion and pressure fusion.

BRIEF DESCRIPTION OF THE DRAWINGS

Embodiments of the invention are better understood with reference to the following drawings. The elements of the drawings are not necessarily to scale relative to each other. Identical reference numerals have been used, where possible, to designate identical features that are common to the figures.

DETAILED DESCRIPTION

Figure 1A:
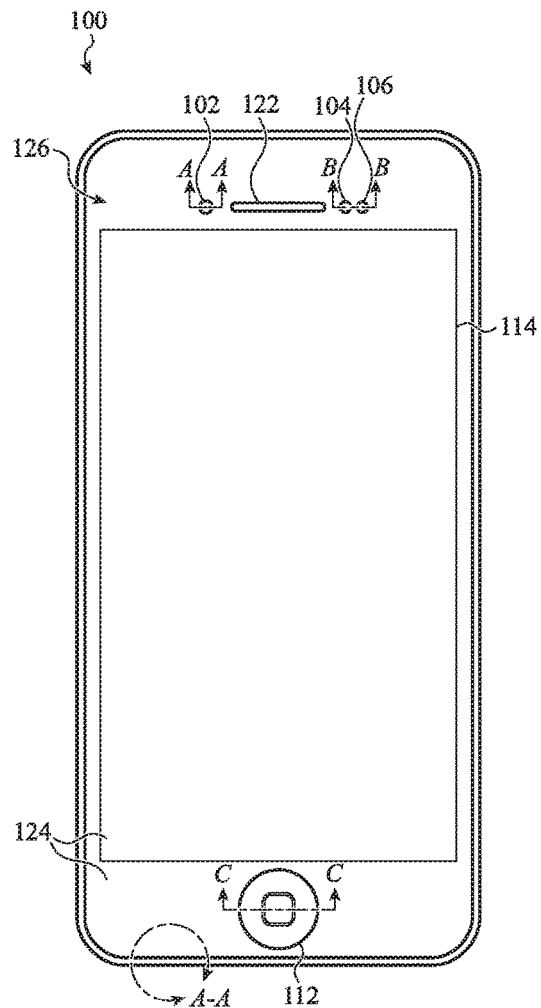
FIG. 1A illustrates a front view of one example of an electronic device with example features including cameras, a home button, a logo, vertical edge cuts and a toothed linear hinge.

Structured glass, meaning glass formed to provide structured glass features, enables novel and unique geometries and features when used in electronic devices. For example, a structured glass may allow more efficient use of interior space, increase operating efficiencies of electronic components, and enable new optical features and mechanical functions.

Generally, embodiments described herein may take the form of an electronic device incorporating a glass structure defining structured glass features. Typical glass structures for computing devices, such as cover glasses, input surfaces, buttons, and the like, are generally planar. This is especially true with respect to an interior surface of a glass structure, e.g., the portion of the glass structure facing an interior of an electronic device. Embodiments may include and/or create structured glass features on or in glass structures, and particularly interior surfaces of glass structures, to enhance functionality of the glass structure and/or associated electronic devices.

A "structured glass feature," as used herein, is a three-dimensional structure formed in a glass substrate. The structured glass feature may extend from the glass substrate, as in the examples of a protrusion, boss, convex lens, raised logo or image, and the like. Alternatively, a structured glass feature may extend into the glass substrate, as in the examples of a concave lens, a recess, aperture, receptacle, or the like. The glass substrate may be formed from multiple layers that are bonded to one another. In some embodiments, the structured glass feature may be formed on, in, or by some, but not all, of the layers; in other embodiments, all layers may cooperate to form the structured glass feature.

As one example, a structured glass feature may be formed in a glass structure to provide additional space for a component of an electronic device. The structured glass feature may be a recess (or other type of aperture) sized or otherwise configured to accept the component or a portion of the component. The recess may be formed to minimize or eliminate undesirable optical effects, such as transitions between the recess portion and the nominal portions of the glass.

As another example, a structured glass feature may be formed in a glass structure to provide increased structural support and construct varied structural framing. A three-dimensional glass portion may form a structural rib within an electronic device to increase stiffness along a specified axis. More comprehensively, a glass structure may include framing components such as trusses to provide defined structural properties, such as stiffness, along identified glass portions.

As another example, a structured glass feature may be formed in a glass structure to provide an integrated lens in optical communication with a device component. The lens may be formed in a glass structure disposed above a camera to alter the nominal focal plane of the camera.

As another example, a structured glass feature may be formed in a glass structure to provide for increased device sensor functionality or increased efficiency. The structured glass feature may form a cavity to reduce the distance between an interior sensor, such as a capacitive-based sensor, and an exterior input, such as a user touch.

As another example, a structured glass feature may be formed in a glass structure to provide optical enhancement to an embedded interior logo. For example, the structured glass feature may optically magnify the logo. The glass structure may form an interior cavity to house a three-dimensional logo, or form a cavity with optical properties so as to present a planar logo as a dimensioned logo, or provide a logo with several material properties to create a unique visual appearance to a user.

As another example, a structured glass feature may be formed in a glass structure to create a mechanical hinge, flexure, or controlled break point. The glass structure may form a linear (or other) sequence of trenches or cuts separated by an elastic material such that the glass structure may bend along an identified axis.

As another example, a structured glass feature may be formed in a glass structure as a sequence of vertical cuts in the glass edge which provide increased adhesion to (or mechanical interlocking with) adjacent components. The vertical cuts enable additional volume of adhesive to reside along contact surfaces between the glass and a surface such as a device frame, thereby increasing bonding strength.

A structured glass feature may be formed in a glass structure in any of several ways. As one example, a glass layer may be obtained and fixtured. A structured glass feature, such as a three-dimensional cavity, may be formed into the glass layer. A portion of the structured glass feature may then be optically coated to optically mask at least a portion of the structured glass feature, such as a perimeter surrounding the structured glass feature and/or a sidewall defining a portion of the structured glass feature.

As another example, a structured glass feature may be formed by combining two or more glass layers. A first and a second substrate may be obtained. A structured glass feature, such as an aperture, is formed into the second substrate. The first and the second substrate are then coupled and fused together, forming a single monolithic structure. In some embodiments, the first and second substrates (such as two glass layers) may be of different sizes, such that a first portion of the first substrate is fused to the second substrate while a second portion is not. The aperture may be optically coated to optically mask at least a portion of the aperture, such as a perimeter surrounding the aperture and/or sidewall defining the aperture. The perimeter may form a boundary of a surface of the structured glass feature.

"Monolithic," as used herein, refers to a structure, set of layers, or the like that are fused together such that material of adjacent layers or pieces intermingle with one another. A "monolithic" structure or element need not lack any physical indication of the separate layers, elements, or pieces from which it is constructed; some monolithic structures may have melt zones, fusing zones, or the like between layers. (Some monolithic structures may lack any such indication to the unaided eye, however.) Rather, monolithic structures formed from separate layers, pieces, or elements have intermingled materials between such layers, pieces, or elements such that their edges (or other portions abutting one another) are not separate.

These and other embodiments are discussed below with reference to FIGS. 1-10. However, those skilled in the art will readily appreciate that the detailed description given herein with respect to these figures is for explanatory purposes only and should not be construed as limiting.

Figure 1B:
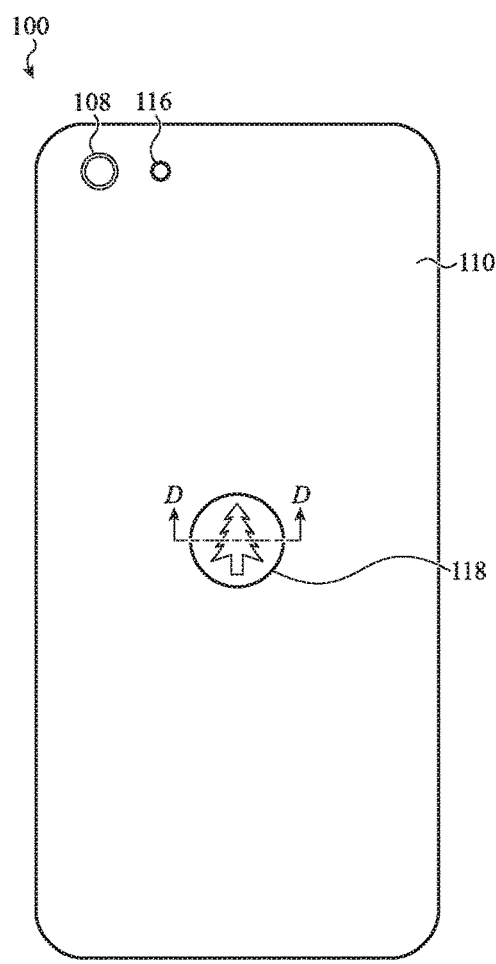
FIG. 1B depicts a rear view of the electronic device shown in FIG. 1A.
Figure 1C:
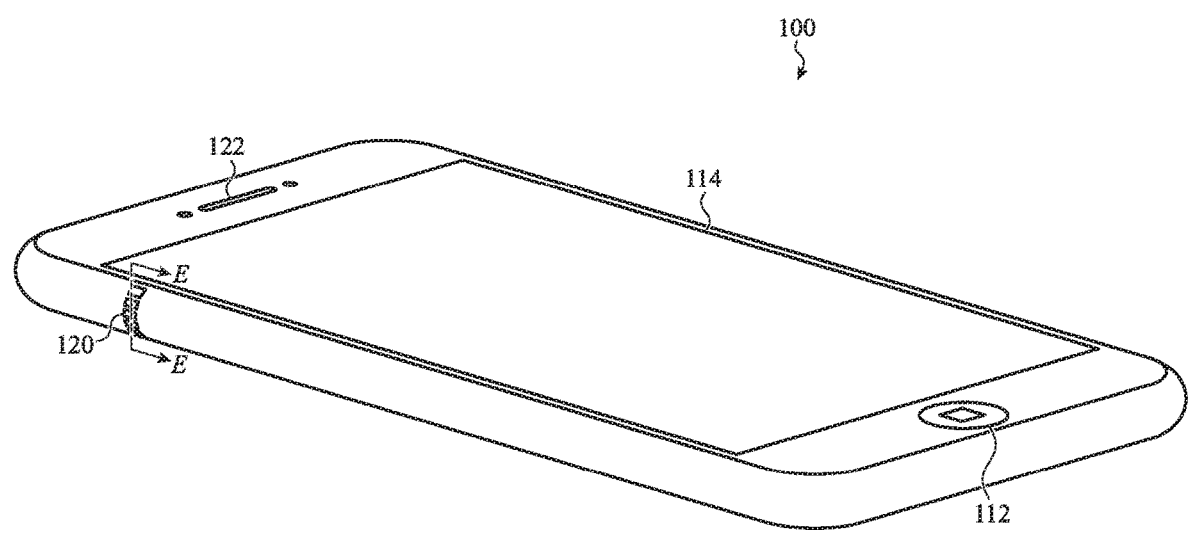
FIG. 1C depicts a side view of the electronic device shown in FIG. 1A.

FIGS. 1A-1C show front, rear, and side views, respectively of one example of an electronic device 100. The electronic device 100 may include features such as one or more cameras, a home button, a logo, vertical edge cuts and a toothed linear hinge. These features are only example features and some or all may be omitted and/or reside in other locations. Other features are possible. The electronic device 100 includes a first camera 102, a second camera 104, a third camera 106, a fourth camera 108, an enclosure 110, an input/output (I/O) member 112, a display 114, a light source for the camera or cameras 116, logo 118, toothed hinge 120, and speaker or microphone 122. The electronic device 100 can also include one or more internal components (not shown) typical of a computing or electronic device, such as, for example, one or more processing units, memory components, network interfaces, and so on.

In the illustrated embodiment, a cover glass 124 is disposed over display 114 of the electronic device 100. The cover glass 124 can be made of any suitable material, including, but not limited to, glass, plastic, acrylic, sapphire, and various combinations thereof. One or more portions of the cover glass 124 can define an input region for a touch sensing device and/or a force sensing device. The cover glass 124 can include one or thinner regions or portions spanning particular components, such as spanning one or more of the cameras, the speaker and/or a microphone 122, the logo 118 and the I/O member 112. More specifically, a structured glass feature may be formed within the cover glass 124 to provide additional space for a component of an electronic device, such as one or more cameras. Such a structured glass feature is discussed in more detail below with respect to FIGS. 2 and 3. The cover glass 124 may also be configured to include one or more thicker regions or portions. For example, the cover glass 124 may form one or more structural ribs. Such a three-dimensional structural feature is discussed in more detail below with respect to FIG. 3B.

In the illustrated embodiment, the cover glass 124 is positioned over the entire front surface of the electronic device 100. Thus, the cover glass 124 is disposed over the display, the first camera 102, the second camera 104, the third camera 106, and the enclosure 110. In other embodiments, a cover glass 124' can be disposed over, or form, one or more portions of other surfaces of the electronic device, such as a top case of the electronic device 100.

As shown in FIGS. 1A-1C, the electronic device 100 is implemented as a mobile telephone. Other embodiments, however, are not limited to this type of electronic device. Other types of computing or electronic devices include a laptop computer, desktop computer, netbook, a phone, a tablet computing device, a wearable computing or display device such as a watch or glasses, a digital camera, a printer, a scanner, a video recorder, a desktop computer, server, touchscreen, a copier, and so on.

The enclosure 128 can form an outer surface or partial outer surface and protective case for the internal components of the electronic device 100, and may at least partially surround the display 114. The enclosure 128 can be formed of one or more components operably connected together, such as a front piece and a back piece. Alternatively, the enclosure 128 can be formed of a single piece operably connected to the display 114.

The I/O member 112 can be implemented with any type of input or output member. By way of example only, the I/O member 112 can be a switch, a button, a capacitive sensor, or other input mechanism. The I/O member 112 allows a user to interact with the electronic device 100. For example, the I/O member 112 may be a button or switch to alter the volume, return to a home screen, and the like. The electronic device can include one or more input members or output members, and any or each member can have a single I/O function or multiple I/O functions. In one embodiment, the cover glass 124 is shaped above the I/O member to provide a reduced thickness between an external input (such as a user touch) and an internal device sensor, thereby increasing sensor performance. Such an embodiment is discussed in greater detail below with respect to FIG. 5.

The cover glass 124 of FIGS. 1A-B may additionally or alternatively be configured to provide vertical edge cuts, a toothed linear hinge and/or a three-dimensional logo cavity feature. The vertical edge cuts, which may enhance coupling or adhesion of the cover glass to the device enclosure, is detailed below with respect to FIG. 8. The toothed hinge feature, which may allow controlled bending of the cover glass, is described below with respect to FIG. 7. And the three-dimensional logo cavity feature, which may provide a holographic presentation of a logo, is described below with respect to FIG. 6.

The display 114 can be operably or communicatively connected to the electronic device 100. The display 114 can be implemented with any type of suitable display, such as a retina display or an active matrix color liquid crystal display. The display 114 can provide a visual output for the electronic device 100 or function to receive user inputs to the electronic device. For example, the display 114 can be a multi-touch capacitive sensing touchscreen that can detect one or more user touch and/or force inputs.

Figure 2A:
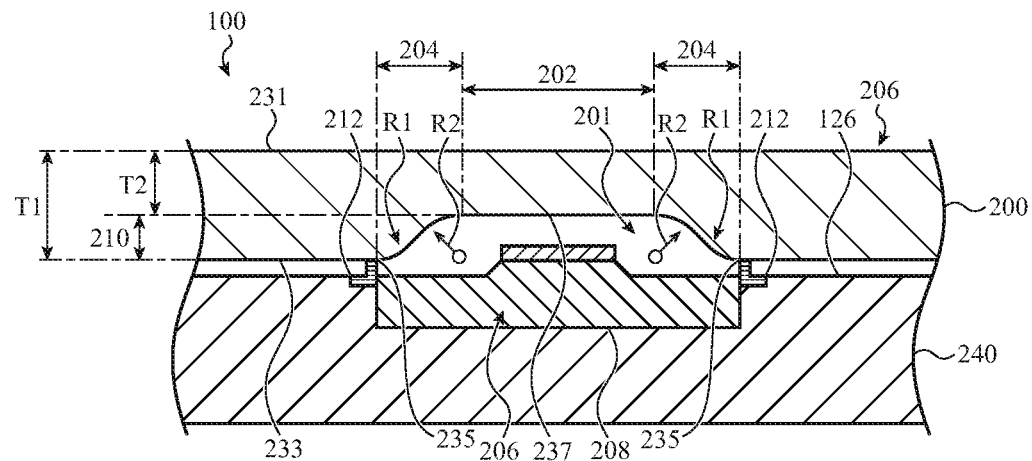
FIG. 2A is a sample cross-section view of the electronic device of FIGS. 1A and 1B, taken along line A-A in FIG. 1A and showing one embodiment of a structured glass feature disposed over a camera.
Figure 2B:
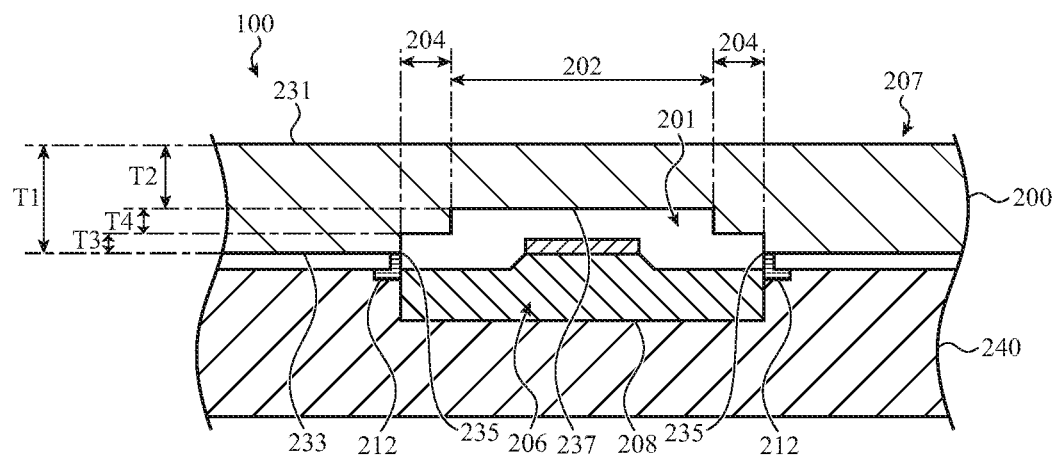
FIG. 2B is a sample cross-section view of the electronic device of FIGS. 1A and 1B, taken along line A-A in FIG. 1A and showing another embodiment of the structured glass feature disposed over a camera.

FIGS. 2A-B are sample cross-section views of the electronic device 100 of FIGS. 1A and 1B, taken along line A-A in FIG. 1A and showing embodiments of a structured glass feature 201 forming a cavity disposed over a camera. As shown in FIG. 2A, a cover glass 200 is disposed over a substrate 240 of the electronic device 100. The structured glass feature 201 may be of any geometry and configuration. The cover glass 200 can be made of any suitable material such as sapphire, glass, plastic, and various combinations of materials.

The cover glass 200 has an upper or externally facing or first surface 231 and a lower or internally facing or second surface 233. The second surface 233 is opposite the first surface 231. The first surface 231 and the second surface 233 define a nominal thickness T1 of the cover glass 200. The cover glass 200 has a thinned region 202 with a thickness T2, as compared to a remainder 206 of the cover glass 200, which has a thickness T1. Generally and as shown, thickness T1 is greater than thickness T2. The second surface 233 of the cover glass 200 forms an interior cavity surface 237. The interior cavity surface 237 has a portion parallel with the first surface 231 that defines a thickness T2 of cover glass 200. The interior cavity surface 237 has a perimeter 235 that bounds the thinned region 200 and region 204 (e.g., a surface of the structured glass feature). A sidewall extends from the perimeter and defines an edge of the aperture.

In one embodiment of the structured glass feature 201, cover glass 200 transitions between thickness T2 of region 202 to thickness T1 of other areas of the cover glass 200 by way of region 204. Region 204 is defined by radius R1 and radius R2; these radiuses, taken together, define a sidewall. Sidewall region 204 begins from, and is bounded by, perimeter 235. Radius R1 begins from the perimeter 235 of the second surface 233 of the cover glass 200. Radius R2 begins from a cover glass 200 portion of thickness T2. Radius R1 and radius R2 intersect tangentially. Radius R1 and radius R2 cooperate to form transition region of the interior cavity surface 237, bounded by the perimeter 235. In one embodiment, the sidewall or transition region 204 is a cover glass 200 defined by only one of R1 or R2, such that one end point of sidewall region 204 forms a step and the other forms a curve. In another embodiment, the sidewall region 204 includes a vertical portion connecting to (and/or terminating at) either of cover glass portion of thickness T1 or to cover glass portion of thickness T2, with the other terminus of the vertical portion connecting to a curved portion. Other configurations and geometries of sidewall region 204 are possible, to include a ramp between cover glass portion 206 of thickness T1 and cover glass portion 202 of thickness T2.

In one embodiment, the geometry of transition region 204 is defined by the method of manufacturing of the structured glass feature 201. The method of manufacturing the structured glass feature 201 is detailed below, but in one embodiment, the tool used to create the structured glass feature 201 defines the transition region 204. For example, if the structured glass feature 201 is formed using a computer numerical controlled ("CNC") grinding and polishing technique, the geometry of the CNC grinding tool may define a CNC tool radius between portion 202 of thickness T2 and the remaining portion 206 of thickness T1. Such a CNC tool radius would define radius R2 in FIG. 2A joining portion 202 and remaining portion 206.

Interior cavity surface 237, to include region 202 of thickness T2, is formed over a device 100 component, such as a camera 207. In one embodiment, the thinner region 202 of thickness T2 may be disposed over the light-receiving region 206 of a camera 208. Region 202 can have any given shape and dimension, to include the planar configuration of FIG. 2A. In some embodiments, the region 202 is coincident with the light-receiving region 206, centered about the light-receiving region 206 and/or centered about a centerline axis of the camera 208. In some embodiments, the region 202 can have a size and/or shape that positions the region 202 over some or all of the non-light receiving regions of the camera 208.

The sidewall or transition region 204 of the cover glass 200 provides additional space 210 for the camera 208 and/or other devices, such as second lens, polarizing filter, etc. In some embodiments, a higher quality camera can be included in the electronic device 100 when the additional space 210 is present than might be possible if the cover glass lacks the structured glass feature. For example, a higher quality camera can include a larger sensor, higher quality lenses, an autofocus feature, and/or a flash module. In some embodiments, a front-facing camera (e.g., camera 102) can be of equal or near-equal quality as a rear-facing camera (e.g., camera 108).

The structured glass feature 201 may be formed over device 100 components other than a camera. For example, the structured glass feature 201 may be formed over all or part of a logo 118, a speaker/microphone 122, and/or internal electronic components of the device 100, such as the main logic board. The additional vertical distance 218 provided by the structured glass feature 201 may enable, for example, a larger and more capable main logic board to be installed in the device 100. In some embodiments, the structured glass feature may be contoured to match, mimic, parallel, or otherwise roughly follow contours of one or more internal components of the electronic device.

One or more brackets 212 can engage with or attach to the camera 207. The bracket or brackets 212 can have any given configuration and size, and can be positioned at any location. The one or more brackets 212 may be positioned below or adjacent the perimeter 235. Any suitable attachment mechanism can be used to attach the camera 207 to the bracket(s) 212 and/or to the frame. By way of example only, an adhesive material and/or a fastener can be used to attach the camera 207 to the bracket(s) 212 and/or to the frame.

In some embodiments, the one or more mounting brackets 212 may provide additional or alternative functions, such as structural support or structural enhancement in the transition regions between varied thickness regions of the cover glass. That is, the mounting brackets may provide structural support at the edge of the transition region 204 from the region 206 of thickness T1 and the region 202 of thickness T2. The mounting brackets may also be configured with optical properties to draw attention to the outline of the structured glass feature 201, or to draw attention away from, or otherwise optically mask, the outline region. Optical masking is disclosed below.

In some embodiments, the one or more mounting brackets 212, if engaged with or replaced with one or more actuators, may provide a means to point or position a device 100 component, such as a camera 207, disposed below the cover glass. For example, the brackets may allow a lens of the camera 207 to extend vertically into the structured glass feature 201, providing an additional functionality to the camera 207. Alternatively or additionally, the brackets 212 may allow the camera 207 to be pointed by rotation of the camera frame or rotation of a camera lens.

In some embodiments, the structured glass feature 201 may be filled with a gas to increase or adjust device performance, such a performance of the camera. For example, the structured glass feature 201 may be filled with a temperature-controlled gas to reduce a temperature differential between the device exterior and the camera, thereby enabling performance of the camera in an extended temperature range, that is, in relatively colder or warmer external temperatures.

The embodiment shown in FIG. 2B is similar to the embodiment shown in FIG. 2A except that the structured glass feature 201 of the cover glass 200 transitions between a region 202 of thickness T2 and a remaining region 206 of thickness T1 by way of steps within transition/sidewall region 204. That is, the sidewall region 204 is not defined by a radius R1 and a radius R2, as in the embodiment of FIG. 2A, but rather by a first step of thickness T3 and a second step of thickness T4.

The first surface 231 and the second surface 233 define a nominal thickness T1 of the cover glass 200. The cover glass 200 has a set of thinned regions of thickness T2 and T2 plus T4. The second surface 233 of the cover glass 200 forms an interior cavity surface 237. The interior cavity surface 237 has a first portion parallel with the first surface 231 that defines a thickness T2 of cover glass 200, and a second portion parallel with the first surface 231 that defines a thickness T2 plus T4 of the cover glass 200. The interior cavity surface 237 has a perimeter 235 that begins from second surface 233 and that forms a boundary of the interior cavity surface. It should be appreciated that the interior cavity surface is stepped, as shown in the figure.

In one embodiment, at least a portion of the interior cavity surface 237, such as the perimeter 235 and/or one or more steps (as depicted in FIG. 2B) are configured to be invisible to the naked eye. Stated another way, least a portion of the interior cavity surface 237 is configured such that the change in thickness is not perceptible to the naked human eye. In one embodiment, the steps of the sidewall region 204 are optically masked such that the transition regions are not visible to the naked human eye. In one embodiment, at least a portion of the interior cavity surface 237 is optically masked such that the transition regions are not visible to the naked human eye.

The optical masking of the sidewall region 204 of the structured glass feature 201 may be achieved in any of several ways, to include through geometric methods and material methods. That is, the sidewall region 204 may be made visually imperceptible by relative dimensioning and shaping of the sidewall region 204 and/or through design of optical properties of the materials forming the sidewall region 204.

The human eye interprets received light waves to provide vision, to include color differentiation and depth perception. Adjustment to received light waves will adjust vision. The most common corrective eye glasses adjust or bend incoming light waves to adjust the eye's interpretation of otherwise uncorrected incoming light waves. Such eye glasses use refraction to adjust the incoming light waves. Refraction is the change in direction of propagation of a wave due to a change in its transmission medium. The refractive index, also known as the index of refraction, is a dimensionless number that describes the degree to which light is bent or refracted within a transmission medium. Functionally, eye glasses place a lens in front of the wearer's eyes. The lens has refractive optical properties to appropriately adjust the incoming light waves, so as to alter the light waves before receipt by the wearer, thereby improving the wearer's vision.

Refraction may be applied to optically mask the sidewall region 204 of the structured glass feature 201 such that the sidewall region 204 is imperceptible to the device 100 user. With respect to a user looking at a target object through a clear piece of glass, a user's eye receives light reflected off the target object that passes essentially unchanged through the clear glass. That is, the target object light passes through the clear glass without a change in direction. However, if the clear glass has an imperfection, such as a change in density, some of the target object light will be altered in direction, and the target object will not be seen as clearly. That is, the object may appear blurred.

Returning to the sidewall region 204 of the structured glass feature 201, the sidewall region 204, depending on geometry and dimension, may adjust some target object light akin to an imperfection in clear glass. However, this optical effect, e.g. the distortion or re-direction of light passing through the sidewall region 204, may be mitigated and/or eliminated by re-directing the altered light to correct for the undesirable distortion. Such a correction or optical masking may be achieved in any of several ways. For example, a portion of glass within the sidewall region 204 of the structured glass feature 201 may be configured with a different index of refraction than the remaining glass portion. For example, a first glass layer may have a first index of refraction and a second glass layer may have a second index of refraction. Thus, as a wave, such as an optical wave, passes from the first glass layer into the second glass layer, the wave will change direction. This change of direction may conceal, correct for, or otherwise remove any optical distortion caused by sidewall region 204 geometries (such as the stepped geometry of FIG. 2B, or the curved geometry of FIG. 2A). Specifically, in regards to the sidewall region 204 of the structured glass feature 201, the transition region may be configured with layers of glass of varied indexes of refraction, so as to provide a perceived optical wave of the same character as that emitted from a portion of glass outside, or not bounded by, the sidewall region 204. Put another way, multiple glass layers having different indices of refraction may cooperate to optically mask a structured glass feature.

In one embodiment, the sidewall or transition region 204 of the structured glass feature 201, including portions with varied refractive properties, is formed through stacked layers of glass. That is, the curved area defined by radius R1 of transition portion 204 of FIG. 2A may be formed of layers of glass with a first index of refraction, such that target light is refracted to adjust or correct for the distortion of light caused by the curved radius R1 portion. Similarly, the curved area defined by radius R2 of transition portion 204 of FIG. 2A may be formed of layers of glass with a second index of refraction, such that target light is refracted to adjust or correct for the distortion of light caused by the curved radius R2 portion. The stacked layers of glass may form a set of fused glass layers that create a single monolithic structure.

In another embodiment, the optical masking of the sidewall region 204 of the structured glass feature 201 is achieved through application of one or more optical films with defined refractive properties. For example, with respect to the sidewall region 204 of the structured glass feature 201, with reference to the sidewall portion 204 of FIG. 2A defined by a radius R1 and a radius R2, a first film with refractive index one may be applied to all or a portion of the surface of sidewall region 204 defined by radius R1, and a second film with a refractive index two may be applied to all or a portion of the surface of the transition region defined by radius R2. Each of the first film and the second film function to reduce or eliminate the refractive distortion caused by the respective radius R1 and radius R2 features, thereby reducing or eliminating a user's optical perception of the sidewall region 204.

The optical effects of the sidewall region 204 as described above may also be used to amplify or magnify, rather than eliminate, optical distortions, or items below the structured glass feature. Such an application is described below with respect to the embedded logo 118 of FIG. 6.

Figure 3A:
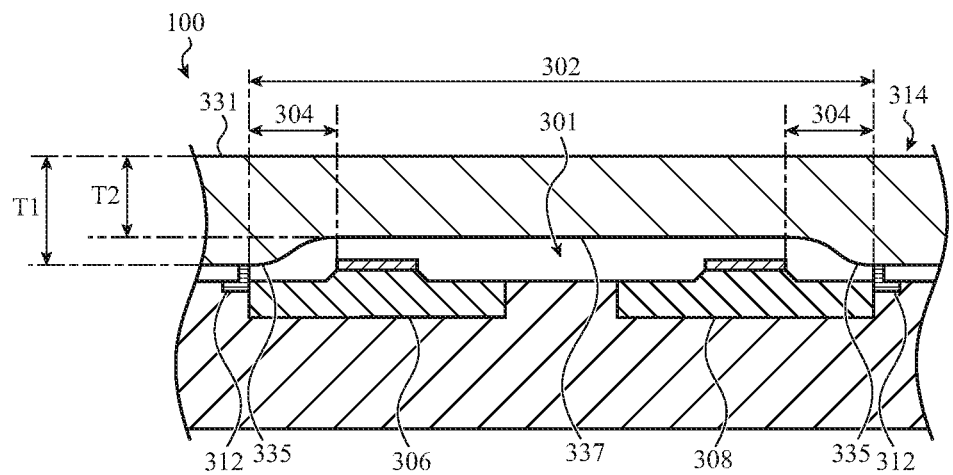
FIG. 3A is a sample cross-section view of the electronic device of FIGS. 1A and 1B, taken along line B-B in FIG. 1A and showing one embodiment of a structured glass feature disposed over two cameras.

FIG. 3A is a sample cross-section view of the electronic device 100 of FIGS. 1A and 1B, taken along line B-B in FIG. 1A and showing one embodiment of a structured glass feature 301 disposed over two cameras. The embodiment shown in FIG. 3A is similar to the embodiment shown in FIG. 2A except that the cover glass 300 has a thinned region spanning a set of electronic device 100 components, such as a first camera 306 and a second camera 308.

The cover glass 300 has a first surface 331 and a second surface 333. The first surface 331 and the second surface 333 define a nominal thickness T1 of the cover glass 300. The cover glass 300 has a thinned region 302 with a thickness T2, as compared to a remainder 314 of the cover glass 300, which has a thickness T1. Generally and as shown, thickness T1 is greater than thickness T2. The second surface 333 of the cover glass 300 forms an interior cavity surface 337. The interior cavity surface 337 has a portion parallel with the first surface 331 that defines a thickness T2 of cover glass 300. The interior cavity surface 337 has, and is bounded by, a perimeter 335 that begins from second surface 333.

Cover glass 300 transitions between thickness T2 of region 302 to thickness T1 of other areas of the cover glass 300 by way of region 304. One or both of first camera 306 and second camera 308 may engage brackets 312. Similar to the brackets discussed above with respect to FIGS. 2A-B, the brackets 312 may comprise actuators which may adjust, move or direct one or both of first camera 306 and second camera 308. Brackets 312 are positioned below or adjacent to perimeter 335.

Figure 3B:
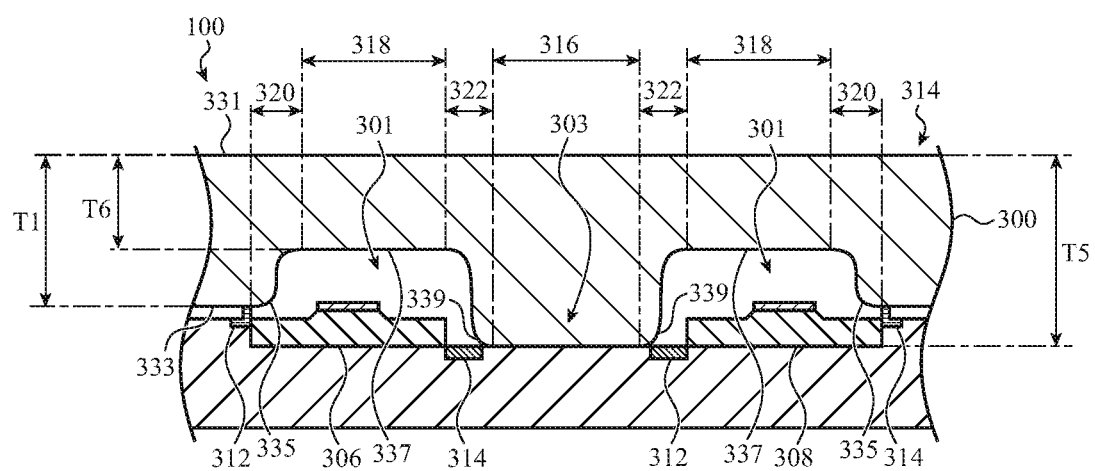
FIG. 3B is a sample cross-section view of the electronic device of FIGS. 1A and 1B, taken along line B-B in FIG. 1A and showing one embodiment of a three-dimensional rib feature disposed between two cameras with a pair of structured glass features disposed over each camera.

The embodiment of FIG. 3B is similar to the embodiment shown in FIG. 3A except that the cover glass 300 has both thinned regions and a thickened region spanning a set of electronic device components, such as a first camera 306 and a second camera 308. The cover glass 300 has a first surface 331 and a second surface 333. The first surface 331 and the second surface 333 define a nominal thickness T1 of the cover glass 300. The second surface 333 of the cover glass 300 forms an interior cavity surface 337. The interior cavity surface 337 has a portion parallel with the first surface 331 that defines a thickness T2 of cover glass 300. The interior cavity surface 337 has a perimeter 335 that begins from second surface 333. The perimeter 335 forms a boundary of the interior cavity surface 337.

Two structured glass features 301 are formed over each camera, and a three-dimensional thickened or protruding region feature 316 (e.g., a structural rib) is formed between the features 301. A pair of thin regions 318 of thickness T6 are disposed above each of first camera 306 and second camera 308. The thin regions 318 are thinner than most other areas 314 of cover glass 314. Cover glass 300 transitions to thin regions 318 by way of sidewall regions 320. Sidewall regions 320 may be formed in any of several geometries, to include one or more radii and one or more steps. Disposed between the paired thinned regions 318 is a thicker region 316 of thickness T5. A transition region 322 transitions from each thinner region 318 to the thicker region 316, and may be formed in any of several geometries, to include one or more radii and one or more steps. It should be appreciated that the protruding structural rib 316 is bounded by a second perimeter 339. One or more brackets 312 and 314 may engage one or more of first camera 306 and second camera 308.

The structured glass feature 303, including relatively thicker region 316, may form a structural rib within an electronic device to increase structural strength or stiffness along a specified axis of the device 100. The structured glass feature 303 forms a second perimeter 339 at each of the structured glass features 301.

The formed structural rib of the structured glass feature 303 may vary in cross-section along its length. That is, the width may vary along the axis of the formed structural rib. Such a configuration enables varied structural strength along the structural rib, which may be desirable in order to design structural strength as a function of varied loading within the device 100. For example, a relatively heavier component (such as a battery) in a first portion of the device 100 may require additional structural strength relative to an area with lighter components. The portion of the device 100 requiring increased strength would be designed with a structured glass feature 303 configured as a structural rib of increased thickness (relative to the cavities and the overall cover glass structure 300) and/or increased depth T5.

In other embodiments, the structured glass feature 303 is a set of structured glass features 303 that form a glass framing structure for all or a portion of the device 100. That is, the structured glass feature 303 comprises primary framing components such as trusses to provide defined structural properties, such as stiffness, along identified glass portions or along large portions of the device 100. In one embodiment, a set of structured glass features 303 form the primary enclosure of the device. In such embodiments, the structured glass features 303 comprise portions of one or more different widths 316 and thicknesses T1.

Methods of manufacturing the structured glass features, such as structured glass feature 303, are detailed below with respect to FIGS. 9-10. In one embodiment, the structured glass feature 303 is formed through placing and fusing of multiple layers of glass. In such a method, the multiple layers of glass may exhibit varied structural properties and thus may serve as design vehicles to form glass structural components of varied strength. That is, some portions of the device may be configured with structured glass of higher strength than others, or with different impact resistance. For example, the portions of cover glass at an edge of a device 100 may be engineered to have increased resistance to cracking or shattering, and thus may be formed from layers of tempered glass. In contrast, an interior portion of a device 100 may be formed of stacks or layers of non-tempered glass.

In some embodiments, the structured glass feature 303 may be formed with an airtight internal cavity filled with a gas to provide for temperature control of the device 100. For example, a gas contained within the internal cavities may be cooled to prevent overheating of the device, or heated to allow device operation in colder external temperatures than would otherwise be allowed. As such, the external operational temperature range of the device 100 is expanded. In one embodiment, such internal cavities may be formed by placing and fusing, or thermoforming, glass layers. That is, the set of glass layers may contain portions with internal gaps or trenches or may be partial layers such that, when stacked with companion layers, an internal channel or cavity is formed.

Figure 4:
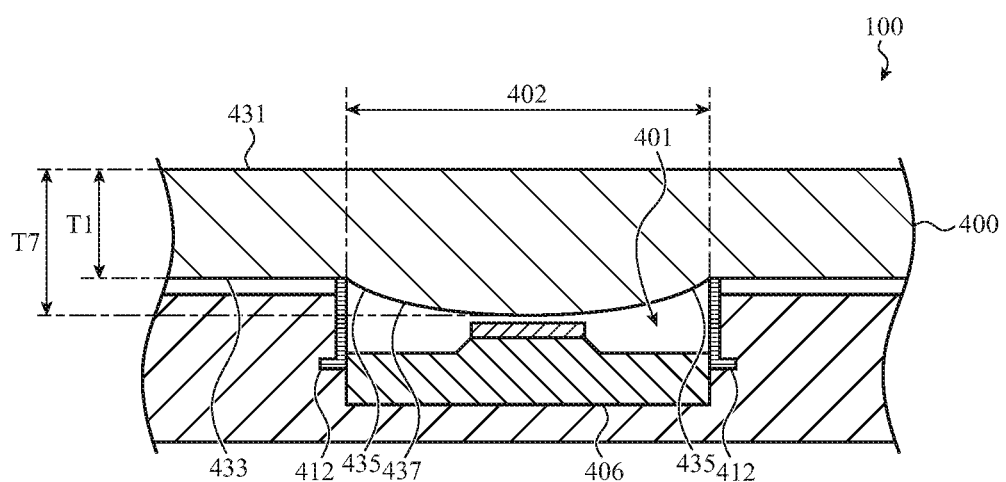
FIG. 4 is a sample cross-section view of the electronic device of FIGS. 1A and 1B, taken along line A-A in FIG. 1A and showing one embodiment of a three-dimensional lens feature.

FIG. 4 is a sample cross-section view of the electronic device 100 of FIGS. 1A and 1B, taken along line A-A in FIG. 1A and showing one embodiment of a three-dimensional lens feature 401. The cover glass 400 has a first surface 431 and a second surface 433, the second surface 433 opposite the first surface 431. The first surface 431 and the second surface 433 define a nominal thickness T1 of the cover glass 400. The cover glass 400 has a thickened region 402 with a maximum thickness T7. The second surface 433 of the cover glass 400 forms an interior cavity surface 437. The interior cavity surface 437 has a perimeter 435 that begins from second surface 433.

The cover glass 400 of the electronic device 100 has a region 402 that is thicker than other areas 414 of the cover glass 400 and forms an optical lens 404. Region 402 is curved so as to form a lens of maximum cover glass thickness T7. The formed lens 404 is disposed over camera 406. In some embodiments, the lens 404 may be coated or treated with a film, such as an anti-reflection film. In some embodiments, the lens may be stacked or disposed adjacent an optical filter, such as a polarization filter.

In one alternate embodiment, rather than a concave lens as shown in FIG. 4, a convex lens is formed, wherein the maximum thickness T7 of the cover glass is less than the thickness T1 of the other areas 414 of the cover glass 400. In some embodiments, the lens 404 is any type of known optical lens, including compound lens such as a biconvex and biconcave lens. The lens 404 may be in optical communication with the light-receiving region of the camera 406.

The camera 406 is may be mounted or engaged with one or more brackets 412. In some embodiments, the brackets 412 function to position the camera 406. In alternate embodiments, the brackets 412 function to adjust the three-dimensional lens feature 401. The brackets 412 may comprise actuators that finely apply pressure to the lens 401 such that the shape of the lens is slightly altered to, for example, improve focus of the camera. Such fine adjustment of the lens 401, typically limited to a sub-wavelength of the light band of interest, is known in the optical sciences as adaptive optics. Generally, in adaptive optics, fine adjustments to the shape of an optical lens serve to calibrate the incoming light to remove known external light distortions, such as distortion caused by atmospheric effects.

In one embodiment, the lens 401 is constructed through placing and fusing of multiple layers of glass, as described above further detailed with respect to FIGS. 9-10 below. In such a method of manufacture, in one embodiment, at least one layer of glass is intentionally stacked with a sub-wavelength gap relative to an adjacent layer.

In one embodiment, a conventional lens is positioned within a three-dimensional cavity, such as the cavity 202 of FIG. 2A, and engaged with actuators such that the lens may be adjusted within the cavity. The adjustment may comprise vertical position adjustment and/or tilt or angular position. Alternatively or additionally, the lens may be adjusted in curvature using the adaptive optics discussed above. In one embodiment, the cavity containing the lens is a sealed cavity such that a gas may be inserted and maintained. The gas may enhance or adjust lens properties, based on type of gas, pressure of gas, or temperature of gas. Thus, adjustment of the gas characteristics provide a way to adjust characteristics of the lens without removing the lens.

Figure 5:
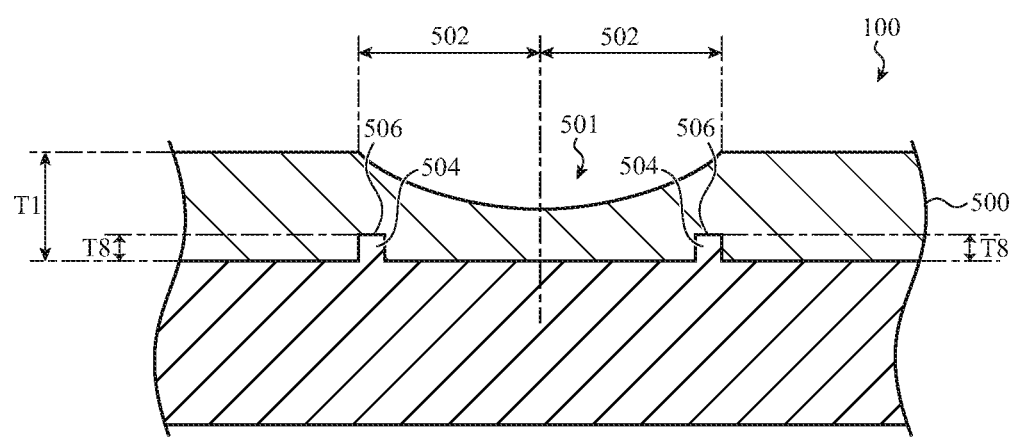
FIG. 5 is a sample cross-section view of the electronic device of FIGS. 1A and 1B, taken along line C-C in FIG. 1A and showing one embodiment of a three-dimensional input/output cavity feature.

FIG. 5 is a sample cross-section view of the electronic device 100 of FIGS. 1A and 1B, taken along line C-C in FIG. 1A and showing one embodiment of a three-dimensional input/output cavity feature 501. In the embodiment of FIG. 5, a cover glass 500 of the electronic device has a region 508 forming at least part of the input/output 112 of the device 100. The region 508 may form a thinned concave depression in the cover glass 500 to a minimum thickness of T2 within a region 508 of thickness T1. One or more trenches 504 of height T8 may also be formed below the region 508. The trenches 504 may be fitted with sensors and/or electronics disposed at surface 506 which are aided by a closer or reduced vertical distance to the surface of region 508. For example, a reduced distance to the surface of the input/output 112 may increase sensitivity of some sensors and/or reduce power requirements to operate some sensors. Also, a region 508 formed within the cover glass 500 may be water tight, thereby eliminating a water entry area common in traditional input/output 112 configurations.

In one embodiment, the trenches 504 are fitted with one end of an induction charging system, which is configured to receive an inductive charge from a device positioned near or within input/output cavity feature 501. Because inductive charging efficiency is increased with a reduction in distance between charging elements, the efficiency of the inductive charging increases because the transmitting inductive charging source may be positioned within the cavity feature 501. A similar increase in efficiency would occur with magnetic connections, that is, the strength of a magnetic connection between a magnet disposed on surface 506 and an external magnet increases when the external magnet is positioned within cavity feature 501.

In another embodiment, the efficiency of haptic communications between the device 100 and a device user increases due to the input/output cavity feature 501. A haptic communication, such as a vibration, may be more efficient or effective if the distance between the vibration source and the haptic receiver is reduced. For example, the cavity 501 may be subject to enhanced and/or localized flexure, insofar as the trenches 504 may change the local stiffness of the feature 501. Accordingly, a haptic output applied to an under surface of the cavity feature 501 may cause the cavity feature 501 to flex more (with respect to the same force) than if the trenches 504 were absent. This enhanced deflection may be more readily felt by a user touching the cavity feature 501, as described below.

The input/output cavity feature 501 allows a user to position her (curved) fingertip within the (curved) input/output cavity feature 501, thereby reducing the distance between a vibration source disposed at 504 and the user's fingertip. Thus, a given vibration energy may be produced with reduced power, given the reduced distance between the user and the vibration source. Or, a given power may yield a higher effective level of vibration energy given the reduced distance between the user and the vibration source.

Figure 6:
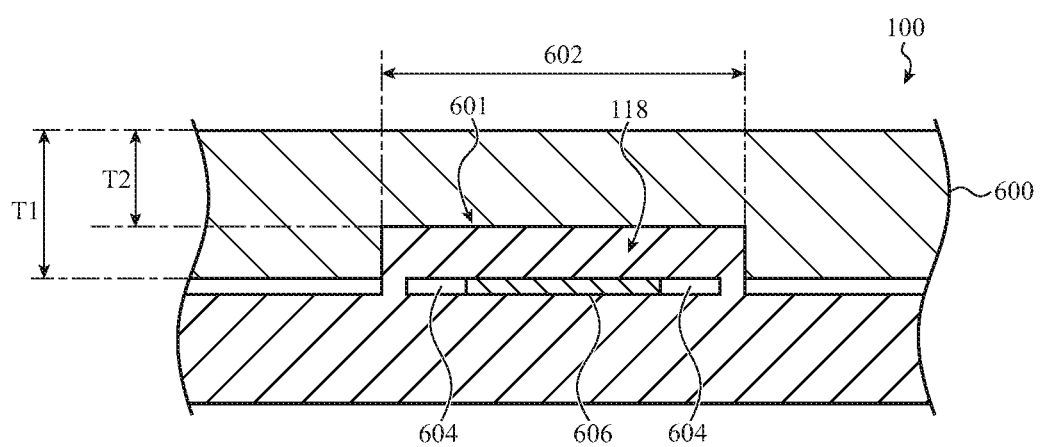
FIG. 6 is a sample cross-section view of the electronic device of FIGS. 1A and 1B, taken along line D-D in FIG. 1A and showing one embodiment of a three-dimensional logo cavity feature.

FIG. 6 is a sample cross-section view of the electronic device 100 of FIGS. 1A and 1B, taken along line D-D in FIG. 1A and showing one embodiment of a three-dimensional logo cavity feature 601. In the embodiment of FIG. 6, a cover glass 500 of the electronic device has a region 602 disposed over a logo 118 of the electronic device 100. The region 602, of thickness T2, is thinner than other areas 608 of the cover glass 600, of thickness T1. The three-dimensional logo cavity feature 601 may be of any configuration and size. For example, the three-dimensional logo cavity feature 601 may form a rectangular cross-section as shown in FIG. 6, but may also form a rounded cavity such as that of FIG. 2A, or a stepped cavity such as that shown in FIG. 2B.

Logo 118 comprises a first logo area 604 and a second logo area 606. The second logo area 606 has different optical properties than the first logo area 604. Logo 118 is disposed in the opening or aperture formed in the cover glass 600 wherein when viewed, the logo 118 appears holographic or three-dimensional. In some embodiments, the logo is formed by a liquid, such as ink. In some embodiments, the logo 118 is a solid material, such as a metal.

The logo 118, separately or in combination with the three-dimensional logo cavity feature 601, may present unique optical characteristics to a user of the electronic device 100. Generally, optical properties of the logo 118 and/or the three-dimensional logo cavity feature 601 may be designed to present optical effects including color variation and magnification. Such optical effects may be achieved through application of refraction and diffraction, for example.

As briefly discussed above with regard to FIGS. 2A-B, the optical concepts employed to mask user perception of the sidewall region 204 may also be used to magnify rather than eliminate optical properties, such as the size of the logo 118*s*. With respect to the logo 118 disposed below the three-dimensional logo cavity feature 601, refraction may be employed to provide optical features of the three-dimensional logo cavity feature 601 and/or logo 118.

In one embodiment, one or more portions of the logo 118, such as the first logo area 604 and a second logo area 606, may be comprised of materials with varied reflective properties. That is, first logo area 604 may comprise a material with a first index of refraction and the second logo area may comprise a second area 606 with a second index of refraction. Thus, the two logo areas will refract or bend incoming light in different ways, and thus will be perceived by a user differently. In one embodiment, the different indices of refraction result in different colors perceived by a user of the electronic device 100. The varied refractive indices may be achieved in any of several ways, to include through application of an optical film and through glass layering (as discussed above with respect to FIGS. 2A-B.)

In another embodiment, the optical diffraction characteristics of the three-dimensional logo cavity feature 601 are used to enable optical features of the logo 118 disposed below the three-dimensional logo cavity feature 601. Diffraction is a change in direction of waves when passing through an opening or around a barrier. With respect to FIG. 6, light emitted from logo 118 may be diffracted in passing through the three-dimensional logo cavity feature 601. For example, if the interior of three-dimensional logo cavity feature 601 were configured with angled features, light emitted from logo 118 would be diffracted (and at least partially reflected) resulting in an optical effect viewable by the user.

In some embodiments, the logo disposed in the three-dimensional logo cavity feature 601 is fitted with one or more actuators to effect movement of the logo or to adjust its optical properties. For example, the logo may be engaged with a vibration source to allow vibration of the logo. In some embodiments, the logo is heat sensitive such that when engaged with a heat source, the logo changes in characteristics, such as color or shape. In one embodiment, the three dimensional cavity feature 601 is airtight and filled with a gas. The gas may be pressurized or temperature controlled to effect optical properties of logo 118.

In other embodiments, the logo 118 may be formed by creating the three-dimensional cavity in the structured glass and coating the cavity walls with an ink, foil, solid, or other suitable material. The cavity need not be filled by the coating material. Rather, since the cavity walls are coated, from the outside the logo may appear to be a solid mass of material filling the cavity even though it is not. This may permit the space within the cavity to house all or part of an internal component, as described above, while the cavity itself (e.g., the structured glass feature) creates the logo 118.

Although embodiments are discussed with respect to a logo, it should be appreciated that any character, symbol, shape or the like may be formed and implemented as described herein. Thus, letters, words, numbers and the like may be formed in certain embodiments.

Figure 7:
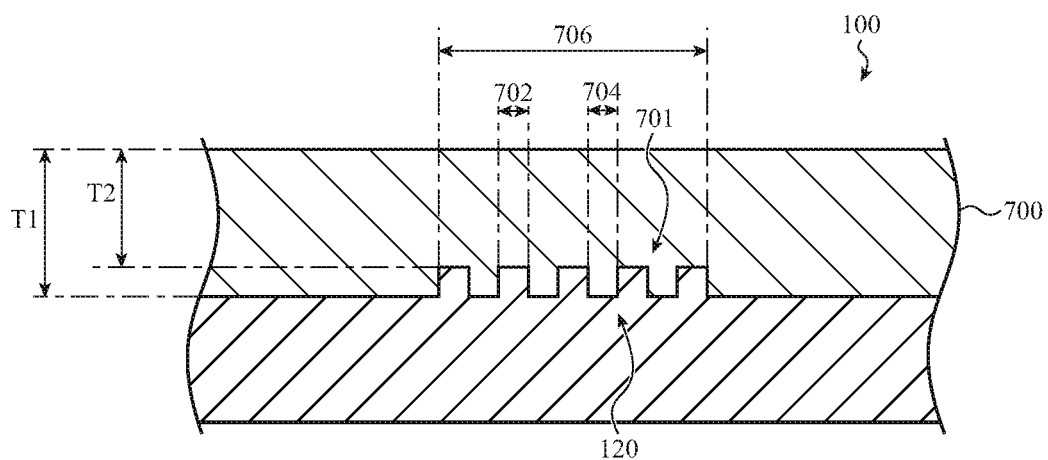
FIG. 7 is a sample cross-section view of a portion of the electronic device of FIGS. 1A and 1B, taken along line E-E in FIG. 1A and showing one embodiment of a three-dimensional hinge feature.

FIG. 7 is a sample cross-section view of the electronic device 100 of FIGS. 1A and 1B, taken along line E-E in FIG. 1A and showing one embodiment of a three-dimensional hinge feature 701. The three-dimensional hinge feature 701 is enabled by a linear sequence of tooth structures formed in glass, the teeth separated by an elastic material. When a bending force is applied to the glass along the axis defined by the sequence of teeth, the elastic material is compressed and the glass bends or hinges, without damage to the surrounding glass. The three-dimensional hinge feature 701 may take any of several forms and configurations.

In the embodiment of a three-dimensional hinge or joining feature 701 depicted in FIG. 7, a cover glass 700 of the electronic device 100 has a region 706 forming a set of teeth elements 120, for example at a split of a mobile telephone as shown in FIG. 1C. In other embodiments the hinge or joining feature 701 can join top and bottom portions of a laptop, such that the top portion may be pivoted with respect to the bottom portion, as an example. The set of teeth elements 120 are generally rectangular in cross-section with width 702, and separated relative to an adjacent tooth by a distance 704. The teeth 120 are of height so as to form a thinner region of thickness T2 above a particular tooth. The gap (of width 704) formed between teeth is fitted with a material with elastic properties, such as a rubber material. The sequence of teeth relative to an adjacent tooth form a line in the cover glass with increased elasticity which allows for controlled bending of the cover glass 700 without fracture or cracking of the cover glass 700. In some embodiments, the hinge or joining feature 701 permits two portions of the device 100 joined by the feature to flex or move relative to one another. In others, the feature 701 joins the two portions without permitting movement.

In another embodiment of the three-dimensional hinge or joining feature 701, the set of regions of distance 704 formed between the set of teeth elements 120 are generally of rounded cross-section, or of rounded cross section with extended planer edges. Such geometry may be readily formed through use of a CNC machine to cut the regions between the teeth.

In one embodiment, the three-dimensional hinge feature 701 is engineered to fail at a specified bending angle, such that user operation of the hinge below the specified bending angle will not result in cracking or breakage of the cover glass. The specified bending angle may be determined through structural properties and geometries of the three-dimensional hinge feature 701. For example, an elastic material with increased elasticity fitted within distance 704 of the three-dimensional hinge feature 701 would provide an increase in maximum bending angle.

In another embodiment, the three-dimensional hinge feature 701 is not used as a hinge but instead is employed to provide controlled flexibility of or near a component of the electronic device 100. For example, mounting brackets 212 of FIGS. 2A-B may be constructed of glass with a three-dimensional hinge feature such that the brackets may flex, move or the like, thereby allowing actuation (such as motion or positional adjustment) of, for example, an adjacent camera 207 positioned on a substrate 240. In one embodiment, the three-dimensional hinge feature is constructed of several stacked layers of glass, the layers of glass with slightly different thermal expansion properties, such that when a heat source is applied to the three-dimensional hinge feature, the three-dimensional hinge feature slightly expands such that the three-dimensional hinge feature moves or actuates.

Figure 8A:
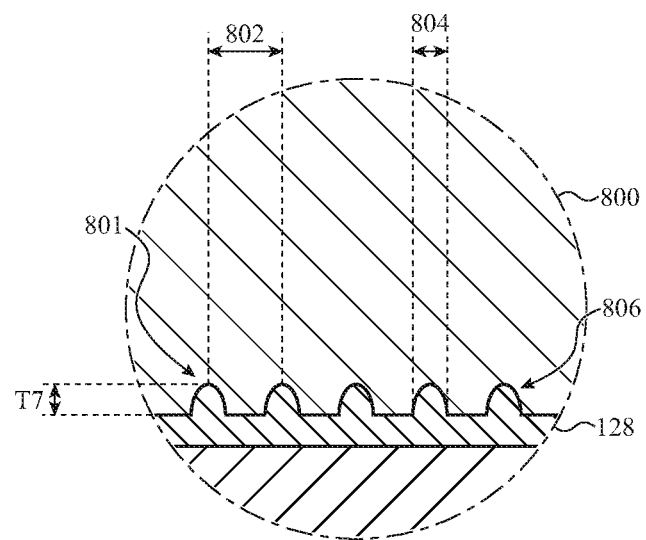
FIG. 8A is a sample detail view A-A of the electronic device of FIGS. 1A and 1B and showing one embodiment of a three-dimensional retention feature.
Figure 8B:
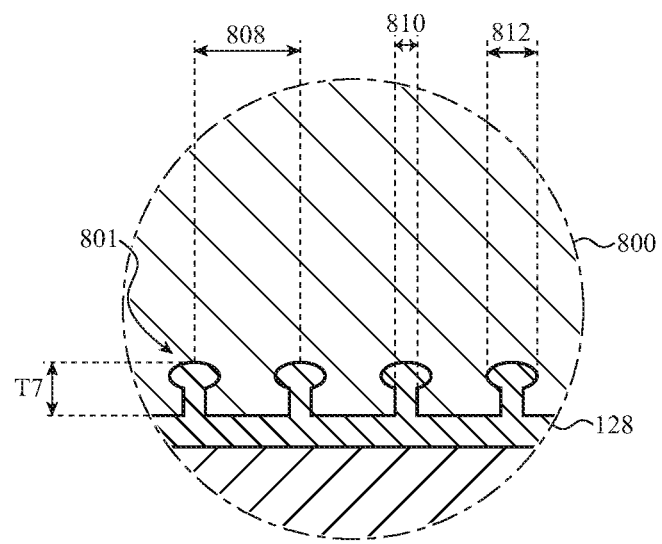
FIG. 8B is a sample detail view A-A of the electronic device of FIGS. 1A and 1B and showing another embodiment of the three-dimensional retention feature.

FIGS. 8A-B are sample detail views A-A of the electronic device 100 of FIGS. 1A and 1B and showing embodiments of a three-dimensional retention feature 801. The sequence of vertical cuts in the glass edge provides increased adhesion to adjacent components by providing additional space to contain adhesive material and to provide increased surface area for the adhesion. That is, the increase in surface area afforded by the three-dimensional retention feature 801 allows an increase in contact surface area between the edge of the cover glass 800 and the enclosure 128. The increase in contact surface area between the bonded surfaces increases adhesion strength because adhesion strength increases with contact surface area. The increased availability of adhesive, as contained in the cavities of the vertical cuts of the three-dimensional retention feature 801, helps to ensure that adhesive is provided between all contact surface areas. Conventional bonding between two planar surfaces commonly contain portions of a contact surface area with little or no adhesive, resulting in an undesirable non-uniform bond and a localized area of weaker bonding strength.

The three-dimensional retention feature 801 may take any of several geometric shapes or configurations. The shape of the three-dimensional retention feature 801 may be, for example, circular, rectangular, or a combination thereof. The grooves may be of any dimension. The sequence of three-dimensional retention features 801 may be uniform or non-uniform. That is, the sequence of three-dimensional retention features 801 may be laterally spaced in a uniform pattern, or may decrease in separation in areas in need of additional adhesion and therefore provide increased strength.

In the embodiment of FIG. 8A, the edge of a cover glass 800 adjacent the enclosure 128 of the electronic device 100 comprises a set of uniform grooves or cuts of height T7. The shape of the three-dimensional retention feature 801 is generally circular with extended planar tangential edges. Such a groove shape of the three-dimensional retention feature 801 may be created by use of a CNC tool applied against the edge of the cover glass 800. Each groove has a width 804 and is separated from an adjacent groove by distance 802. The enclosure defines a set of projections or protrusions 806 that are received within the three-dimensional retention features. These projections 806 may mate with the edge features 801 to join the enclosure 128 to the cover glass 800, or otherwise mechanically interlock or retain the two in a position or alignment with respect to one another. An adhesive or the like may facilitate such interlocking and/or retention, although the adhesive may be omitted in many embodiments.

In the embodiment of FIG. 8B, generally similar to the embodiment shown in FIG. 8A, the set of three-dimensional retention features 801 include a trench feature to provide an additional cavity to hold adhesive. The trench is of width 812 of a groove of width 810 and relative separation to adjacent grooves of distance 808. The grooves are of height T7. In some embodiments, the trenches of FIG. 8B are formed by way of laser undercutting. Here, the three-dimensional retention features 801 are undercut to form a mushroom cross-section, such that a head of each retention feature is larger in cross-section than a channel of each retention feature. Thus, when material of the enclosure 128 (or any other suitable material) is placed within the head and channel of the three-dimensional retention features 801, the combination of enclosure and cover glass 800 may resist separation. It should be appreciated that the enclosure 128 may be metal, plastic, ceramic, and/or another layer of glass that is affixed to, mechanically interlocked with, or fused with the cover glass at the set of three-dimensional retention features.

The three-dimensional retention feature 801 may serve any of several additional functions in addition to aiding adhesion or mechanical interlocking. For example, the grooves may provide a space to engage or secure an elastic material that is positioned between the edge of the cover glass 800 and the enclosure 128. Such an elastic material may provide impact absorption in the event of an impact to the electronic device 100, such as caused by dropping of the electronic device 100. In another example, the three-dimensional retention feature 801 may function to engage or secure an electrical component of the electronic device 100, such as an antenna, or a three-dimensional glass feature such as a colored glass three-dimensional glass feature. Such a colored glass structured glass feature may function to bring attention to the edge of the electronic device, for design or aesthetic purposes.

The above embodiments and/or features of structured glass may be manufactured or produced in any of several ways. The following methods, alone or in combination, may be used: computer numeric control (CNC) grinding, followed by chemical and/or mechanical polishing; etching, to include masked etching; ultrasonic machining optionally with ultrasonic machining; laser ablation, laser machining, and/or laser polishing; vacuum forming optionally with vacuum polishing; and glass bonding. In some embodiments, the cover glass is a homogeneous and/or a monolithic glass.

Sample, but not exhaustive, manufacturing processes will now be discussed. It should be appreciated that various operations described below may be combined with other operations (described herein or otherwise) to form a structured glass feature in a structured glass element. Accordingly, combinations of processes, operations, and the like that are set out herein are contemplated. Further, the various operations, processes, and methods discussed herein may be used, singly or in various combinations, to form any feature and/or structure discussed herein, as well as other such features and/or structures.

Figure 9:
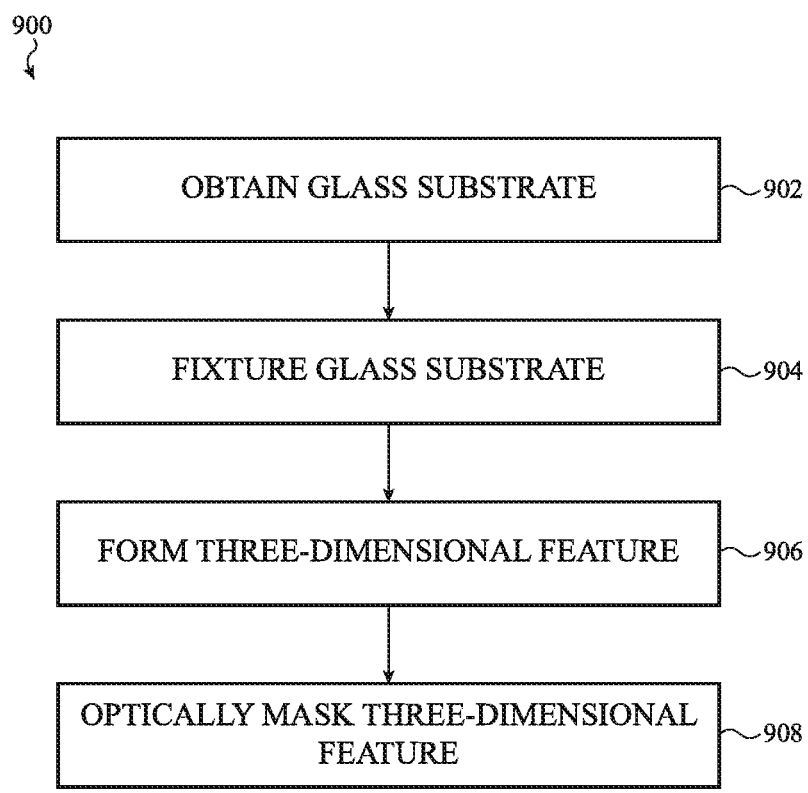
FIG. 9 is a sample process for manufacturing a structured glass feature in a glass layer.

FIG. 9 depicts an example process 900 that may be used to manufacture a structured glass feature. The operation of process 900 may be performed, for example, to form the structured glass features described above with respect to FIGS. 1-8.

In operation 902, a glass layer is obtained. The glass layer may be of any optical substrate made of glass, to include thin and ultra-thin glass wafers. In one embodiment, the glass layer is a sapphire glass.

In operation 904, the glass layer is fixtured. The substrate may be fixtured as a whole, for example by being clamped or otherwise retained along its edges, corners, on a major surface area of the glass, and so on. However, it may be useful to locally fixture the glass in the region in which the structured glass feature is to be formed. The fixture may serve as a guide or mask to prevent over-removal of material. Further, local fixturing may ensure that the glass is well supported at or around the area in which the structured glass feature is formed. In some embodiments, a support may abut, retain, and/or fixture the glass within millimeters, or even microns, of an edge of the area removed to form the structured glass feature.

In operation 906, the structured glass feature is formed. The structured glass feature may form a cavity surface defining a perimeter, the cavity surface and perimeter formed within a first thickness of the substrate.

Any of several methods may be used to form the structured glass feature into a thickness of the glass layer. For example, some structured glass features may be formed by mechanically removing portions of a glass layer. For example, a grinder, router, CNC machine, or the like may be used to mechanically remove material from the glass layer to form the structured glass feature (and thus, shape the substrate into a glass structure). Similarly, a laser may ablate material to form the structured glass feature. Some embodiments may chemically etch the glass layer to form it into a structured glass (e.g., glass having a structured glass feature). The chemical etch may be locally applied and may be neutralized once the structured glass feature is formed. For example, the glass layer may be masked around the region in which the structured glass feature is formed, in order to prevent the etchant from removing excess material. The etchant may be applied by spraying, vapor deposition, as a bath, a stream, and so on.

Machining, etching, and lasering processes may yield a relatively rough surface, a surface with micro-cracks or micro-voids defined therein, or both. Generally, the rougher a surface, the less optically transparent it is. When the surface is placed above a camera, even small flaws, cracks, voids, and the like may be readily apparent in images captured through the structured glass insofar as the camera may magnify these flaws. Likewise, even small imperfections in a structured glass feature above a graphical display may be readily apparent; the underlying display may cause the imperfection to refract or reflect light, thereby drawing attention to the imperfection. These imperfections may cause a sparkling effect, haze, or translucency in the glass over the display. Also, for aesthetic reasons, it may be undesirable to optically cover or mask the perimeter formed around a structured glass feature. Generally, the perimeter and/or the imperfections that may be created during operation 906 may be mitigated or removed by operation 908.

In operation 908, all or a portion of the structured glass feature may be optically masked. The optical masking operation may be performed in any of several ways, alone or in combination. For example, the structured glass feature may be polished in one or more operations. Each polishing operation may use a subsequently finer polishing material and/or head to progressively reduce the size of imperfections. Similarly, the surfaces defining the structured glass feature may be ground or otherwise abrasively treated to reduce imperfections.

In some embodiments, an optically clear sealant, adhesive, or the like (collectively, "sealant") may be applied to one or more surfaces defining the structured glass feature. Typically this sealant is applied after the feature is formed and its surfaces are polished or otherwise processed, although the sealant can be applied at any time. The sealant may fill in any remaining micro-cracks or other imperfections, thereby strengthening the structured glass feature and reducing a risk of mechanical failure. The sealant may have other properties, such as acting as a light filter, a polarizer, a color shifter, or the like. For example, the sealant may enhance images taken by a camera within (or partially within) the structured glass feature. In this manner, the sealant may cooperate with an internal component to enhance operation of some facet of the associated electronic device.

As previously discussed, some embodiments may apply ink, metal, or another opaque coating to some portion of the structured glass feature, or parts of the structured glass adjacent the structured glass feature. The ink may conceal imperfections in the glass or may be used to provide the illusion that the structured glass feature is fully filled with a material when only its edges, walls, or the like are coated.

Further, some embodiments may mechanically pre-stress the glass layer prior to mechanically cutting, or lasering, it. Pre-stressing the glass layer may reduce surface imperfections formed when material is removed. The fixturing structure may pre-stress the glass layer, as appropriate, or it may be separately pre-stressed.

Figure 10:
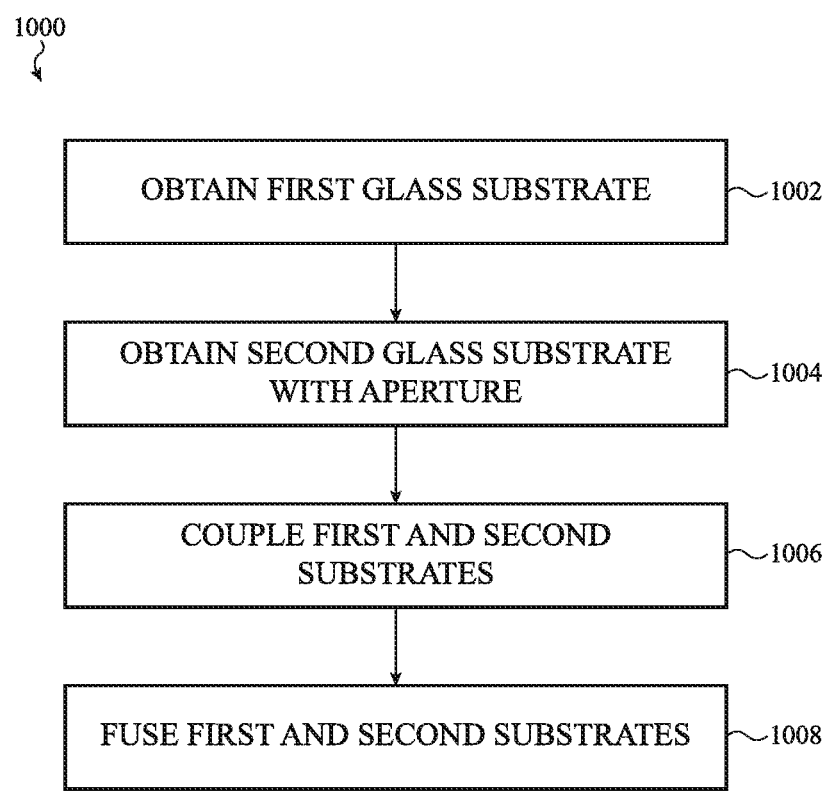
FIG. 10 is another sample process for manufacturing a structured glass feature in a glass layer.

FIG. 10 depicts an example process 1000 that may be used to manufacture a structured glass feature. The operation of process 1000 may be performed, for example, to form the structured glass features described above with respect to FIGS. 1-8.

In operation 1002 a first glass layer is obtained. Operation 1002 is similar to operation 902 of example process 900.

In operation 1004, a second glass layer is obtained. The second glass layer includes an aperture. The aperture may be formed through the second glass layer or form a cavity within a thickness of the second glass layer. The aperture may be formed by in a similar manner to that described with respect to operation 906 of example process 900.

In operation 1006, the first and the second substrates are coupled or positioned adjacent one another (e.g., such that they are touching or nearly touching one another, or in any event sufficiently close to be fused to one another in subsequent operations). The substrates may be coupled in a precise manner with aid of a fixturing device, as described above with respect to operation 904 of example method 900. For example, the second substrate may include a three-dimensional aperture that forms a cavity intended to be positioned below a precise location of the first substrate, such that ultimately the cavity is positioned below a sensor component of a host electronic device.

In operation 1008, the first and the second substrate are fused to form a single substrate. The resulting single substrate may form a single monolithic structure. The fusion of the first and the second substrate may be performed in any of several ways. For example, some embodiments may fuse the substrates by a thermoforming process to fuse the glass layers into a single monolithic structure. Several glass layers, sheets or the like may be stacked to form an outline of a structured glass feature (or multiple features). The glass layers may be subject to heat and/or pressure to fuse them into a single mass or single monolithic structure. In some embodiments, a mold or similar structure may define the structured glass feature to ensure the glass does not slump or flow into inappropriate areas. In other embodiments, no mold or the like is used.

Further, some embodiments may mechanically pre-stress one or more of the set of glass layers prior to fusing them together and/or forming a structured glass feature. Pre-stressing the glass layer(s) may reduce surface imperfections formed when material is removed. The fixturing device may pre-stress the glass layer(s), as appropriate, or they may be separately pre-stressed.

The operations of example method 900 and example method 1000 may be combined. For example, the optical masking operation 908 of example method 900 may be applied in the example method 1000.

It should be appreciated that the glass layers need not all be flat. Likewise, the glass layers need not all have a uniform size or any single uniform dimension; different layers may be of different sizes. By using differently-sized glass layers, a variety of structured glass features may be formed in a variety of different shapes and with different dimensions. Further, in many embodiments, multiple pieces of glass may be used to form any given layer. In some embodiments, a first glass layer may be larger than a second, adjacent glass layer. Accordingly, a first portion of the first glass layer may be fused to the second glass layer while a second portion is not. Additionally, one or more material properties (such as strength, stiffness, elasticity, impact resistance, opacity, indices of refraction, and the like) may vary between two or more glass layers.

Figure 11:
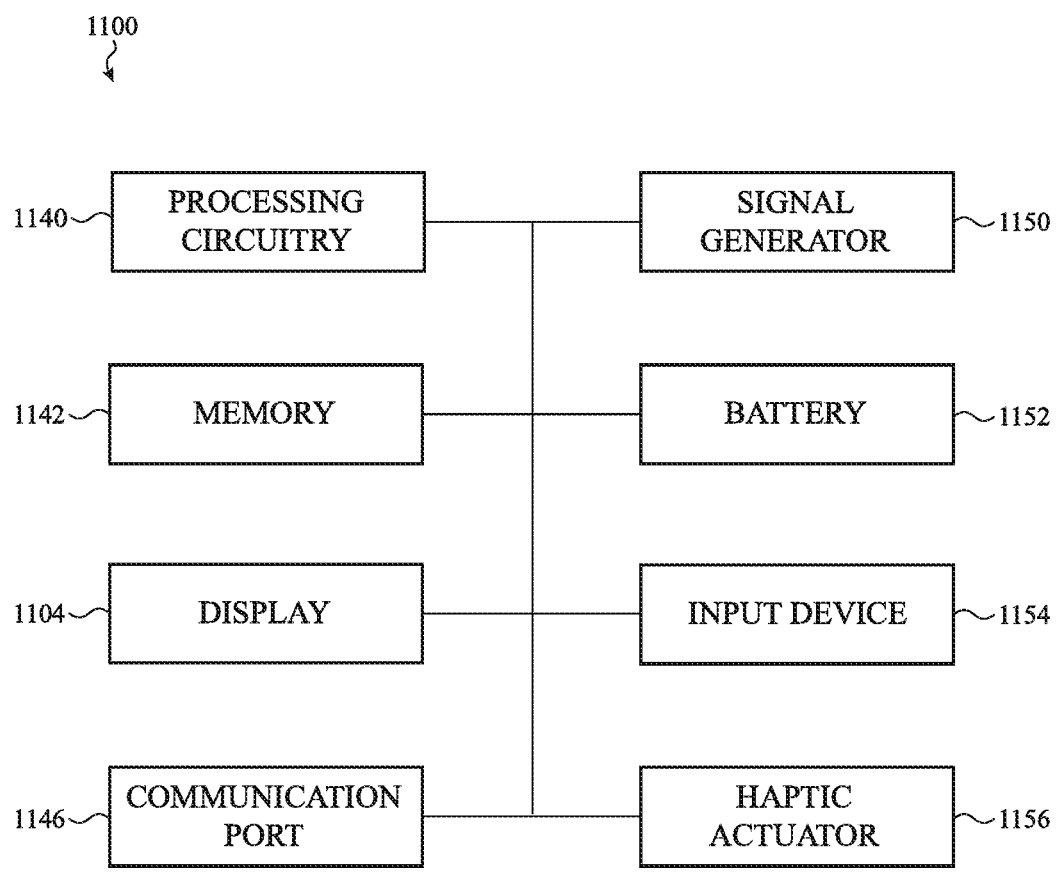
FIG. 11 depicts example components of an electronic device in accordance with the embodiments described herein.

FIG. 11 depicts example components of an electronic device in accordance with the embodiments described herein. The schematic representation depicted in FIG. 11 may correspond to components of any device described above, such as a laptop computer, tablet computing device, mobile phone, digital media player, and so on. However, FIG. 11 may also more generally represent other types of electronic devices having substrates (particularly glass layers) with structured glass features formed therein and/or thereon.

The device 1100 generally includes processing circuitry 1140, such as one or more processing units. The processing circuitry 1140 is operatively connected to components of the device 1100. The processing circuitry 1140 is configured to detect input, initiate output, and generally control various operations and/or functions of the electronic device 1100.

In addition the processing circuitry 1140 may be operatively connected to computer memory 1142. The processing circuitry 1140 may be operatively connected to the memory 1142 component via an electronic bus or bridge. The processing circuitry 1140 may include one or more computer processing units or microcontrollers that are configured to perform operations in response to computer-readable instructions. The processing circuitry 1140 may include a central processing unit (CPU) of the device 1100. Additionally or alternatively, the processing circuitry 1140 may include other processing units within the device 1100 including application specific integrated chips (ASIC) and other microcontroller devices. The processing circuitry 1140 may be configured to perform functionality described in the examples above.

The memory 1142 may include a variety of types of non-transitory computer-readable storage media, including, for example, read access memory (RAM), read-only memory (ROM), erasable programmable memory (e.g., EPROM and EEPROM), or flash memory. The memory 1142 is configured to store computer-readable instructions, sensor values, and other persistent software elements.

The memory 1142 can store electronic data that can be used by the signal generator 1150. For example, the memory 1142 can store electrical data or content, such as timing signals, algorithms, and one or more different electrical signal characteristics that the signal generator 1150 can use to produce one or more electrical signals. The electrical signal characteristics include, but are not limited to, an amplitude, a phase, a frequency, and/or a timing of an electrical signal. The processing circuitry 1140 can cause the one or more electrical signal characteristics to be transmitted to the signal generator 1150. In response to the receipt of the electrical signal characteristic(s), the signal generator 1150 can produce an electrical signal that corresponds to the received electrical signal characteristic(s).

In this example, the processing circuitry 1140 is operable to read computer-readable instructions stored on the memory 1142. The computer-readable instructions may adapt the processing circuitry 1140 to perform the operations or functions described herein. The computer-readable instructions may be provided as a computer-program product, software application, or the like.

The device 1100 may also include a battery 1152 that is configured to provide electrical power to the components of the device 1100. The battery 1152 may include one or more power storage cells that are linked together to provide an internal supply of electrical power. The battery 1152 may be operatively coupled to power management circuitry that is configured to provide appropriate voltage and power levels for individual components or groups of components within the device 1100. The battery 1152, via power management circuitry, may be configured to receive power from an external source, such as an alternating current power outlet. The battery 1152 may store received power so that the device 1100 may operate without connection to an external power source for an extended period of time, which may range from several hours to several days.

In some embodiments, the device 1100 also includes a display 1104 that renders visual information generated by the processing circuitry 1140. The display 1104 may include a liquid-crystal display, light-emitting diode, organic light emitting diode display, organic electroluminescent display, electrophoretic ink display, or the like. If the display 1104 is a liquid-crystal display or an electrophoretic ink display, the display may also include a backlight component that can be controlled to provide variable levels of display brightness. If the display 1104 is an organic light-emitting diode or organic electroluminescent type display, the brightness of the display 1104 may be controlled by modifying the electrical signals that are provided to display elements.

In some embodiments, the device 1100 includes one or more input devices 1154. The input device 1154 is a device that is configured to receive user input. The input device 1154 may include, for example, a push button, a touch-activated button, biometric sensor, force sensor, or the like. In some embodiments, the input devices 1154 may provide a dedicated or primary function, including, for example, a power button, volume buttons, home buttons, scroll wheels, and camera buttons. Generally, a biometric input device and a force sensor may also be classified as input components.

The device 1100 may also include a haptic actuator 1156. The haptic actuator 1156 may be implemented as described above, and may be a ceramic piezoelectric transducer. The haptic actuator 1156 may be controlled by the processing circuitry 1140, and may be configured to provide haptic feedback to a user interacting with the device 1100.

The device 1100 may also include a communication port 1146 that is configured to transmit and/or receive signals or electrical communication from an external or separate device. The communication port 1146 may be configured to couple to an external device via a cable, adaptor, or other type of electrical connector. In some embodiments, the communication port 1146 may be used to couple the device 1100 to another computing device.

Various embodiments have been described in detail with particular reference to certain features thereof, but it will be understood that variations and modifications can be effected within the spirit and scope of the disclosure. And even though specific embodiments have been described herein, it should be noted that the application is not limited to these embodiments. In particular, any features described with respect to one embodiment may also be used in other embodiments, where compatible. Likewise, the features of the different embodiments may be exchanged, where compatible. For example, although the embodiments shown in FIGS. 2-4 depict the front-facing first camera 102 (FIG. 1A), those skilled in the art will recognize that the invention can be used with the rear-facing second camera 108. Additionally, a cover glass arrangement can include multiple thinner or multiple thicker regions formed in a cover glass.

What is claimed is:

1. An electronic device, comprising:
  a glass structure defining:
    a first glass surface;
    a second glass surface that is opposite the first glass surface;
    a cavity formed into the second glass surface in a region of the glass structure having a first thickness, the cavity defined by:
      a stepped region having a second thickness that is less than the first thickness and defined by a third glass surface; and
      a bottom region having a third thickness that is less than the second thickness and defined by a fourth glass surface;
  an enclosure coupled to the glass structure;
  a processing unit within the enclosure; and
  a camera operationally connected to the processing unit and extending at least partially into the cavity; wherein:
  the first glass surface defines a portion of an exterior of the electronic device.

2. The electronic device of claim 1, wherein:
  the cavity defines an optical lens;
  the glass structure defines:
    a first portion having a first index of refraction; and
    a second portion having a second index of refraction; and
  the glass structure is a cover glass of the electronic device.

3. The electronic device of claim 1, wherein:
  the glass structure is a monolithic glass structure formed by fusing a first glass layer to a second glass layer.

4. The electronic device of claim 1, wherein:
  the cavity is positioned over a logo; and
  the cavity optically magnifies the logo.

5. The electronic device of claim 1, wherein:
  the cavity is a first cavity; and
  the glass structure further defines:
    a second cavity; and
    a structural rib separating the first cavity from the second cavity.

6. A method of manufacturing a glass structure of an electronic device, comprising:
  placing a set of glass layers;
  fusing the set of glass layers to form a monolithic glass structure defining:
    a first glass surface; and
    a second glass surface that is opposite the first glass surface, the monolithic glass structure forming a cover glass for an electronic device;
  forming a cavity in a region of the monolithic glass structure having a first thickness, the cavity defined by:
    a stepped region having a second thickness that is less than the first thickness and defined by a third glass surface; and
    a bottom region having a third thickness that is less than the second thickness and defined by a fourth glass surface.

7. The method of claim 6, further comprising pre-stressing the set of glass layers before the operation of forming the cavity.

8. The method of claim 6, wherein forming the cavity occurs after fusing the set of glass layers.

9. The method of claim 6, wherein the cavity is formed by chemical etching.

10. The method of claim 6, further comprising applying an optical coating to a perimeter of the monolithic glass structure.

11. The method of claim 6, wherein the cavity forms a logo.

12. The method of claim 6, further comprising applying a sealant to a surface of the cavity.

13. The method of claim 6, wherein the set of glass layers are of differing sizes.

14. The electronic device of claim 5, wherein the structural rib protrudes beyond the second glass surface of the glass structure.

15. The electronic device of claim 1, further comprising a mask layer on the third glass surface.

16. The electronic device of claim 15, wherein the mask layer is an opaque mask layer.

17. The electronic device of claim 1, wherein the glass structure is a front cover of the electronic device.

18. The electronic device of claim 6, wherein the structural rib has a fourth thickness that is greater than the first thickness.

19. The electronic device of claim 1, wherein the electronic device is a mobile phone.

* * * * *